(12) United States Patent
An

(10) Patent No.: US 8,434,803 B1
(45) Date of Patent: May 7, 2013

(54) ADHESIVE TOOLS AND METHODS OF USING ADHESIVE TOOLS

(76) Inventor: Joo Won Jennifer An, Los Angeles, CA (US)

( * ) Notice: Subject to any disclaimer, the term of this patent is extended or adjusted under 35 U.S.C. 154(b) by 0 days.

(21) Appl. No.: 13/326,097

(22) Filed: Dec. 14, 2011

(51) Int. Cl.
  *B66F 19/00* (2006.01)
(52) U.S. Cl.
  USPC .......................................................... 294/212
(58) Field of Classification Search .................. 294/212, 294/219, 27.1; 16/407
  See application file for complete search history.

(56) References Cited

U.S. PATENT DOCUMENTS

| | | | | |
|---|---|---|---|---|
| 1,524,399 A * | 1/1925 | Krueger | ........................... | 16/407 |
| 5,186,542 A * | 2/1993 | Seabold | ........................... | 383/25 |
| 5,470,116 A * | 11/1995 | DeWoskin | ..................... | 294/212 |
| 5,647,624 A * | 7/1997 | Beshara, Jr. | .................. | 294/27.1 |
| 5,967,574 A * | 10/1999 | Weichman et al. | ............ | 294/212 |
| 6,375,239 B1 * | 4/2002 | Reed et al. | .................... | 294/27.1 |
| 2003/0173788 A1 * | 9/2003 | Fussell et al. | ................. | 294/19.1 |

* cited by examiner

*Primary Examiner* — Saul Rodriguez
*Assistant Examiner* — Gabriela Puig
(74) *Attorney, Agent, or Firm* — Foley & Lardner LLP

(57) ABSTRACT

A tool is attachable to a card and is useable to pull the card out of a card slot of a wallet. The tool includes a sticky end having two portions between which at least a portion of the card is insertable and which are stickable to the card, and a pulling end that extends away from the card when the sticky end is stuck to the card. A tool is attachable to an object, and the tool includes a first part, a second part, and a tab part. The first part has adhesive for adhering to a first side of the object. The second part has adhesive for adhering to a second side of the object opposite the first side of the object. The tab part is connected to the first part and the second part. A method allows for using an adhesive tool to pull a card.

4 Claims, 5 Drawing Sheets

ADHESIVE TOOLS AND METHODS OF USING ADHESIVE TOOLS

BACKGROUND

1. Field of the Invention

Embodiments of the present invention relate generally to adhesives that stick to objects.

2. Background Information

Many people use wallets to hold cards such as credit cards, debit cards, identification cards, insurance cards, and the like. The cards are typically placed in card slots in the wallets. A card slot is generally a pocket that is slightly wider than a card and that has a depth such that a small portion of the card is visible and able to be grasped when the card is in the card slot. The card slots in some wallets are stacked on top of each other and are slightly offset in a depth direction from one another, which allows for stacking multiple cards in a compact space.

In some situations it can be difficult for users of wallets to pull cards out of card slots. For example, users may go to nail salons and get nail polish on their finger nails, which may then make it difficult for a user to pull a credit card out of a card slot to pay the nail salon without messing up the freshly applied nail polish. Users with long finger nails, fat fingers, and/or poor dexterity, may also have trouble pulling cards out of card slots. Pulling cards out of card slots may be especially problematic for elderly users of wallets who may have poor dexterity and poor eyesight for seeing the tops of the cards in the slots.

The cards in the card slots may also be difficult to identify when they are in the slots, because only small portions of the cards are visible. The problem of identifying cards may be even more troublesome for cards that have been placed upside down or backwards within the card slots. If a user is unable to identify a needed card by an initial glance, then the user may have to pull up and push back down several cards in sequence to locate the desired card, which can be annoying for the user. Another problem that some people with cards have is difficulty with managing their money, such as forgetting that some cards have low balances or are to be used only in emergencies. All of the above problems can be particularly severe for users with a large number of cards and small or compact wallets. Users of other types of card holders than wallets, such as card clips, rubber banded cards, or the like, may also have problems in organizing, identifying, and accessing their cards.

SUMMARY OF THE DISCLOSURE

A tool in accordance with various embodiments of the present invention can be used to help people pull cards out of their card holders, such as wallets, card clips, and the like. A card may be, for example, a debit card, a credit card, a driver's license, a student identification card, an insurance card, or the like. The tool may have multiple parts, such as parts for sticking and pulling. In various embodiments, a sticky end of the tool has two portions with adhesive, and a card is insertable between the two portions of the sticky end. In various embodiments, a pulling end of the tool comprises at least one of metal, plastic, and rubber, and is connected to the sticky end. When the sticky end is stuck to a card and the card is in a card slot of a wallet, a user can pull the pulling end to pull the card out of the card slot.

The tool could also be used as an identifier. A design or other type of graphic may be printed or placed on the pulling end of the tool. The design may be, for example, a logo, a brand, a cartoon character, an image, or the like. In various embodiments, a graphic on the pulling end provides indicia as to a type of card to which the tool is intended to be attached, and the graphic can be used to identify a card when it is attached to the card. Such tools could be used as organizers to help users organize cards in their card holders, such as wallets and card clips. Such tools could also be used as reminders, for example, with printed designs to remind users that certain cards are to be used only in emergencies or are associated with accounts that have low balances. Thus, tools in accordance with various embodiments have many functions, such as being used as an identifier, an organizer, a reminder, a pulling aid, an accessory, or the like.

In various embodiments, the tool could be used to help disadvantaged people, such as deaf or blind users, sort and organize their cards in their card holders, such as wallets, card clips, rubber banded cards, and the like. In some embodiments, printed language for the deaf or blind could be placed on a tab portion of the tool to specify or identify a card to which the tool is attached. For example, a tool to be used for a debit card may have "debit card" in a printed language on a tab of the tool, so that deaf or blind users could decipher which card to use when they are at various locations such as a grocery store, bank, doctor's office, or the like. In some embodiments, the printed language is Braille or other type of touchable code for use by the blind or other users.

In some embodiments, the sticky end of the tool is peelable off of a card to allow for a user to remove the tool from the card, and is also reattachable to the card after having been peeled off of the card. The ability to peel the tool off of the card and then reattach the tool may be useful, for example, if the card needs to be placed into a machine, such as an automated teller machine, that would not be able to accept the card with the tool attached.

A tool in accordance with an embodiment is attachable to a card and is useable to pull the card out of a card slot of a wallet. The tool has a sticky end having two portions between which at least a portion of the card is insertable and which are stickable to the card. The tool also includes a pulling end that extends away from the card when the sticky end is stuck to the card. In various embodiments, the two portions of the sticky end each have a sticky side that face each other. In some embodiments, the two portions of the sticky end are two separate pieces that are connected to the pulling end. In various other embodiments, the sticky end is a single continuous body with the two portions and is bent. In various embodiments, the sticky end is peelable from the card after being stuck to the card. In some embodiments, the pulling end comprises at least one of metal, plastic, and rubber. Also, in some embodiments, the sticky end comprises a different material than the pulling end.

A tool in accordance with another embodiment is attachable to an object. The tool includes a first part, a second part, and a tab part. The first part has adhesive for adhering to a first side of the object. The second part has adhesive for adhering to a second side of the object that is opposite the first side of the object. The tab part is connected to the first part and the second part. In various embodiments, a side of the first part that has adhesive faces a side of the second part that has adhesive. In some embodiments, the object is placeable at least partially between the first part and the second part. Also, in some embodiments, the first part is a same size as the second part. In some embodiments, the first part and the second part are parts of a single continuous body that is bent.

In various embodiments, the adhesive on the first part and the adhesive on the second part have an adhesiveness such that the first part and the second part are stickable to the object and are also peelable from the object to be removed from the object after being stuck to the object. This would allow for the tool to be used on an object and then removed from the object after use. In some instances the tool may be reattached to the object after having been removed from the object and the adhesive on the first part and the second part may allow for multiple removals and reattachments of the tool.

In various embodiments, the tab part is arranged such that the tab part extends away from the first part and the second part to allow a user to grip the tab part when the first part and the second part are adhered to the object. In some embodiments, the tab part comprises at least one of metal, plastic, and rubber. Also, in some embodiments, the tool further includes a graphic or other design on the tab part. The graphic may be, for example, a logo, a brand, a cartoon character, an image, or the like, and in some instances the graphic identifies the card to which the tool is attached. The object to which the tool is attachable may be, for example, a card, a piece of paper, or the like.

A method in accordance with an embodiment allows for using a tool to pull a card out of a card slot of a wallet. The method includes sticking a first part of the tool to a first side of the card, sticking a second part of the tool to a second side of the card that is opposite the first side of the card, placing the card into the card slot of the wallet, and pulling a tab part of the tool that is attached to the first part and the second part, so as to pull the card out of the card slot of the wallet. In various embodiments, the card is positioned at least partially between the first part of the tool and the second part of the tool when the first part of the tool and the second part of the tool are stuck to the card. The tool may be affixed anywhere on the card for personal visibility preferences. For example, the tool could be attached near a printed name of the card to make swiping easier when making purchases.

In some embodiments, the tab part of the tool extends away from the card to be grasped by a user when the first part of the tool and the second part of the tool are stuck to the card. Also, in some embodiments, the method further includes peeling the first part of the tool and the second part of the tool off of the card. In various embodiments, the method further comprises placing a graphic on the tab part of the tool. The graphic placed on the tool may identify the card to which the tool is attached.

DETAILED DESCRIPTION OF PREFERRED EMBODIMENTS

Figure 1A:
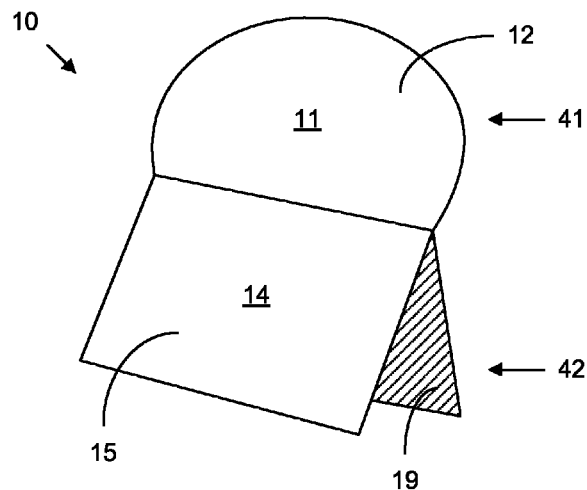
FIG. 1A is a perspective view of a tool in accordance with an embodiment of the present invention.
Figure 1B:
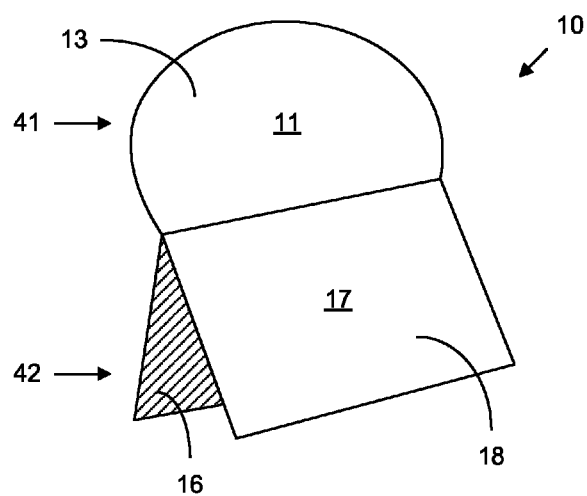
FIG. 1B is an opposite side perspective view of the tool of FIG. 1A.

FIG. 1A is a perspective view of a tool 10 in accordance with an embodiment of the present invention. FIG. 1B is an opposite side perspective view of the tool 10 of FIG. 1A. With reference to FIGS. 1A and 1B, the tool 10 comprises a first part 14, a second part 17, and a tab part 11. The first part 14 has a first side 15 and a second side 16. The second part 17 has a first side 18 and a second side 19. The tab part 11 has a first side 12 and a second side 13. The tab part 11 is a pulling end 41 of the tool 10, which a user may grasp with fingers to pull the tool 10. The first part 14 and the second part 17 are portions of a sticky end 42 of the tool 10. Thus, the sticky end 42 of the tool 10 has two portions, which are the first part 14 and the second part 17. The tool 10 is attachable to a card, such as a debit card, a credit card, a driver's license, a student identification card, or the like.

Figure 2A:
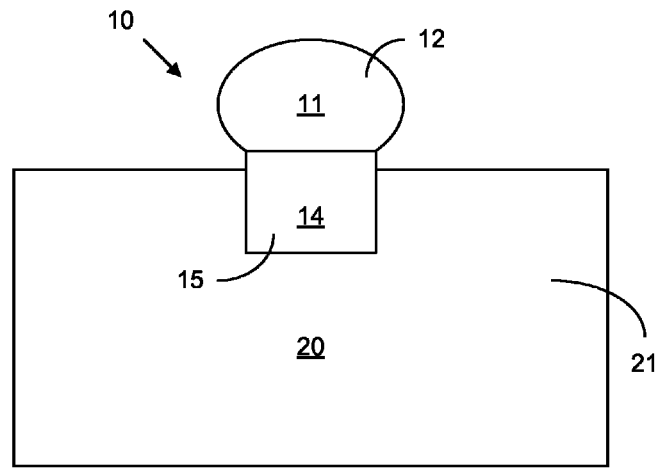
FIG. 2A is a front view of the tool of FIG. 1A when the tool is attached to a card.
Figure 2B:
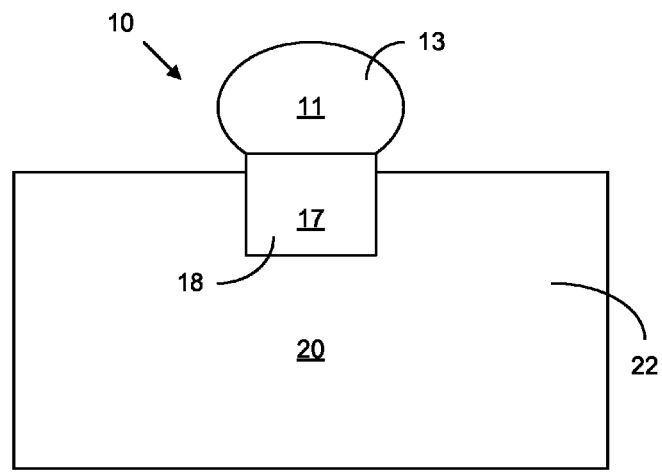
FIG. 2B is a back view of the tool of FIG. 1A when the tool is attached to a card.

FIG. 2A is a front view of the tool 10 when it is attached to a card 20. FIG. 2B is a back view of the tool 10 when it is attached to the card 20. With reference to FIGS. 1A, 1B, 2A, and 2B, the tool 10 is attachable to the card 20 and is useable to pull the card 20 out of a card slot of a wallet. The tool 10 is also usable to pull the card 20 out of other types of card holders, such as a card clip, or the like. The card 20 is insertable between the two portions of the sticky end 42 of the tool 10, which are the first part 14 and the second part 17 of the tool 10. The first part 14 and the second part 17 of the tool 10 are stickable to the card 20. The second side 16 of the first part 14 is at least partially covered with adhesive for adhering to a first side 21 of the card 20. The second side 19 of the second part 17 is also at least partially covered with adhesive for adhering to a second side 22 of the card 20 that is opposite the first side 21 of the card 20.

The pulling end 41 that includes the tab part 11 extends away from the card 20 when the sticky end 42 is stuck to the card 20. The tab part 11 is connected to the first part 14 and the second part 17. The tab part 11 is arranged such that the tab part 11 extends away from the first part 14 and the second part 17 to allow a user to grip the tab part 11 when the first part 14 and the second part 17 are adhered to the card 20. In various embodiments, the tab part 11 comprises metal, plastic, rubber, or the like. In some embodiments, the material for the tab part 11 is a thin metal. In some embodiments, the material for the tab part 11 is elastic or rubber. In various embodiments, the tab part 11 comprises a durable material that that allows for a user to pull on the tab part 11 without breaking the tab part 11.

The two portions of the sticky end 42, which are the first part 14 and the second part 17, each have a sticky side, which are the second side 16 and the second side 19, that face each other. In such embodiments, the second side 16 of the first part 14 that has adhesive faces the second side 19 of the second part 17 that has adhesive. Thus, in such embodiments, the sticky end 42 has two sides 16 and 19 with an adhesive, and the card 20 is placed between the two sides 16 and 19 of the sticky end 42, so the sticky end 42 is double-sided adhesive. With the tool 10, therefore, the card 20 is placeable at least partially between the first part 14 and the second part 17. In some embodiments, the sticky end 42 is a single continuous body including the two portions and is bent. In such embodiments, the first part 14 and the second part 17 are parts of a single continuous body that is bent. In some embodiments, the first part 14 and the second part 17 are individual bodies that are each connected to the tab part 11. In various embodiments, the sticky end 42 comprises a different material than the pulling end 41.

In some embodiments, the sticky end 42 is peelable from the card 20 after being stuck to the card 20. In some embodiments, the adhesive on the first part 14 and the adhesive on the second part 17 having an adhesiveness such that the first part 14 and the second part 17 are stickable to the card 20 and are also peelable from the card 20 to be removed from the card 20 after being stuck to the card 20. In various embodiments, the tool 10 is attachable, removable, and reattachable to the card 20, which would allow for temporarily removing the tool 10 from the card 20. The ability to remove and reattach the tool 10 is useful, for example, if the card 20 is an automated teller machine (ATM) card that is insertable into an ATM, because the tool 10 could be removed from the card 20 to allow for inserting the card 20 into the ATM and then reattached to the card 20 after the card 20 is removed from the ATM.

The tool 10 could be affixed anywhere on the card 20 for personal visibility preferences. For example, the tool 10 could be attached near a printed name on the card 20 to make swiping easier when making purchases. The card 20 is an example of a type of object to which the tool 10 is attachable. The tool 10 is attachable to other objects, such as paper, notebook dividers, and the like. In some embodiments, the tool 10 is attachable to pages in an organizer or dividers in a binder to allow for identifying or turning pages or dividers.

The tool 10 could also be used as an identifier. In various embodiments, a design or other type of graphic is printed or placed on the tab part 11 to allow for identifying an object to which the tool 10 is attached. The design may be, for example, a logo, a brand, a cartoon character, an image, or the like. In various embodiments, a graphic on the pulling end 41 provides indicia as to a type of card to which the tool 10 is intended to be attached, and the graphic can be used to identify a card when it is attached to the card. Such tools could be used as organizers to help users organize cards in their card holders, such as wallets and card clips. Such tools could also be used as reminders, for example, with printed designs to remind users that certain cards are to be used only in emergencies or are associated with accounts that have low balances. Thus, tools in accordance with various embodiments have many functions, such as being used as an identifier, an organizer, a reminder, a pulling aid, an accessory, or the like.

Figure 3:
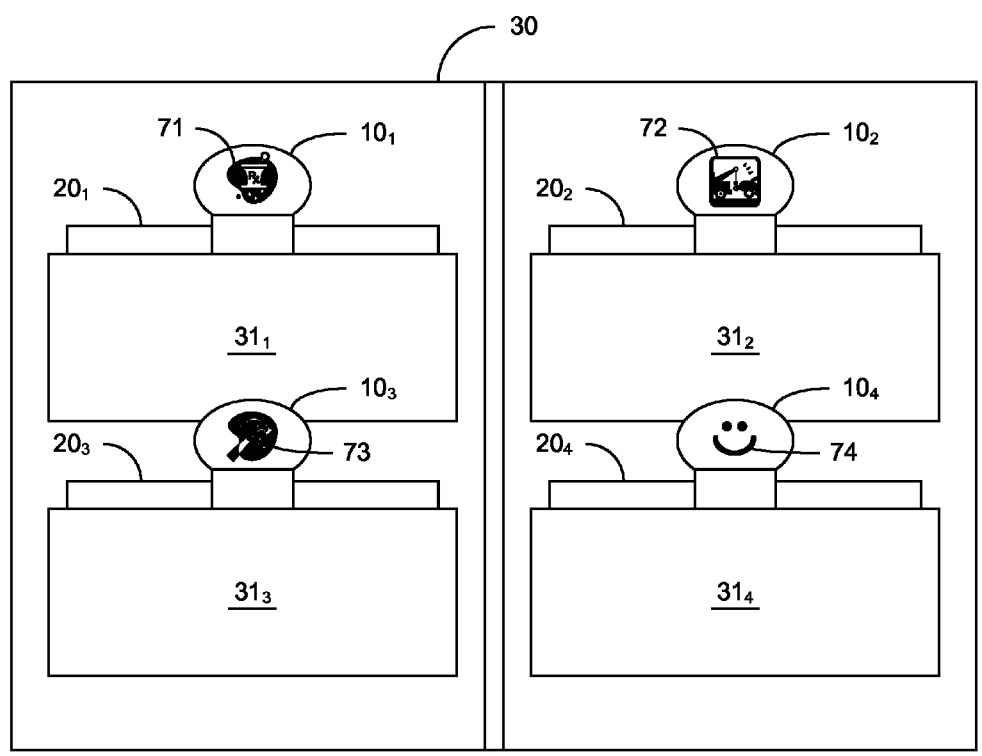
FIG. 3 illustrates a wallet with card slots in which cards with attached tools are located in accordance with an embodiment of the present invention.

FIG. 3 illustrates an example of a wallet 30 with card slots $31_1$, $31_2$, $31_3$, $31_4$, into which cards $20_1$, $20_2$, $20_3$, $20_4$, have been placed. Attached to each of the cards $20_1$, $20_2$, $20_3$, $20_4$, is a corresponding one of the tools $10_1$, $10_2$, $10_3$, $10_4$. The tools $10_1$, $10_2$, $10_3$, $10_4$ are able to be gripped by a user to pull the corresponding cards $20_1$, $20_2$, $20_3$, $20_4$ out of the corresponding card slots $31_1$, $31_2$, $31_3$, $31_4$ of the wallet 30. Thus, the tools $10_1$, $10_2$, $10_3$, $10_4$ can be used as accessories and aids to help a user pull the cards $20_1$, $20_2$, $20_3$, $20_4$ out of the corresponding card slots $31_1$, $31_2$, $31_3$, $31_4$ of the wallet 30. Such tools may be especially useful for people with long finger nails, people who carry a large number of cards in their wallet, and people who carry small and compact wallets with a limited number of sleeves for card slots, because the tools can help them to easily remove cards from their wallets. Such tools could also help young teenagers and adults manage their money better by, for example, using a tab of a tool as a visual aid or reminder to not use a particular credit card on a daily basis but only in emergencies, or to remind a user that there is a low balance in an account associated with a particular card.

In various embodiments, the tools $10_1$, $10_2$, $10_3$, $10_4$ are further used for organizational purposes to help identify the cards. An exterior of the pulling end of each of the tools $10_1$, $10_2$, $10_3$, $10_4$ may have a design or other graphic printed or placed upon it for identification or decorative purposes. The designs may be, for example, a logo, a brand, a cartoon character, an image, or the like. As an example, the tool $10_1$ includes a graphic 71 of a prescription logo on the tab part, and the tool $10_1$ may be attached to a prescription card in which case the graphic 71 would identify the card. As another example, the tool $10_2$ includes a graphic 72 of a tow truck towing a car and the tool $10_2$ may be attached to an automobile club card in which case the graphic 72 would identify the card. As yet another example, the tool $10_3$ includes a graphic 73 of a hammer with nails and the tool $10_3$ may be attached to a credit card for a home improvement store in which case the graphic 73 would identify the card. The graphics on the cards may also be for aesthetic or accessory purposes, such as the smiley face graphic 74 on the tool $10_4$. Another example would be a dog design for decorative purposes on a tool for a person who loves dogs.

In various embodiments, the tools $10_1$, $10_2$, $10_3$, $10_4$ could be used to help disadvantaged people, such as deaf or blind users, sort and organize their cards in their card holders, such as wallets, card clips, rubber banded cards, or the like. As an example, printed language for the deaf or blind could be placed on a tab part of a tool, to specify or identify a card to which the tool is attached. For example, a tool to be used for a debit card may have "debit card" in a printed language on a tab part of the tool, so that deaf or blind users could decipher which card to use when they are at various locations such as a grocery store, bank, doctor's office, or the like. In some embodiments, the printed language is Braille or other type of touchable code for use by the blind or other users.

Figure 4:
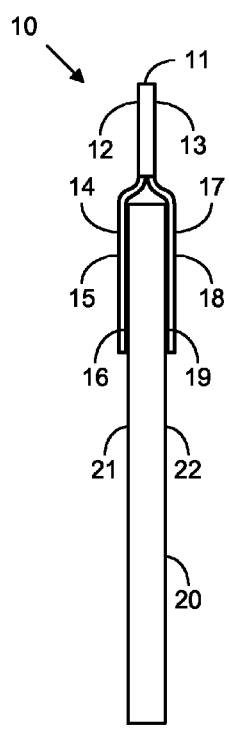
FIG. 4 illustrates a side view of a tool attached to a card in accordance with an embodiment of the present invention.

FIG. 4 is a side view of the tool 10 when it has been attached to the card 20. As shown in FIG. 4, the tab part 11 is connected to the first part 14 and the second part 17. The second side 16 of the first part 14 is adhered to the first side 21 of the card 20, and the second side 19 of the second part 17 is adhered to the second side 22 of the card 20 that is opposite the first side 21 of the card 20. Thus, the card 20 is positioned at least partially between the first part 14 and the second part 17. The first side 12 of the tab part 11 and the second side 13 of the tab part 11 are able to be gripped by the fingers of a user to allow the user to pull the tool 10 with the attached card 20. In some embodiments, the first part 14 and the second part 17 have lengths such that they are able to extend at least one-quarter of a distance down a card when they are attached to the card. In various embodiments, any suitable lengths could be used for the first part 14 and the second part 17.

Figure 5:
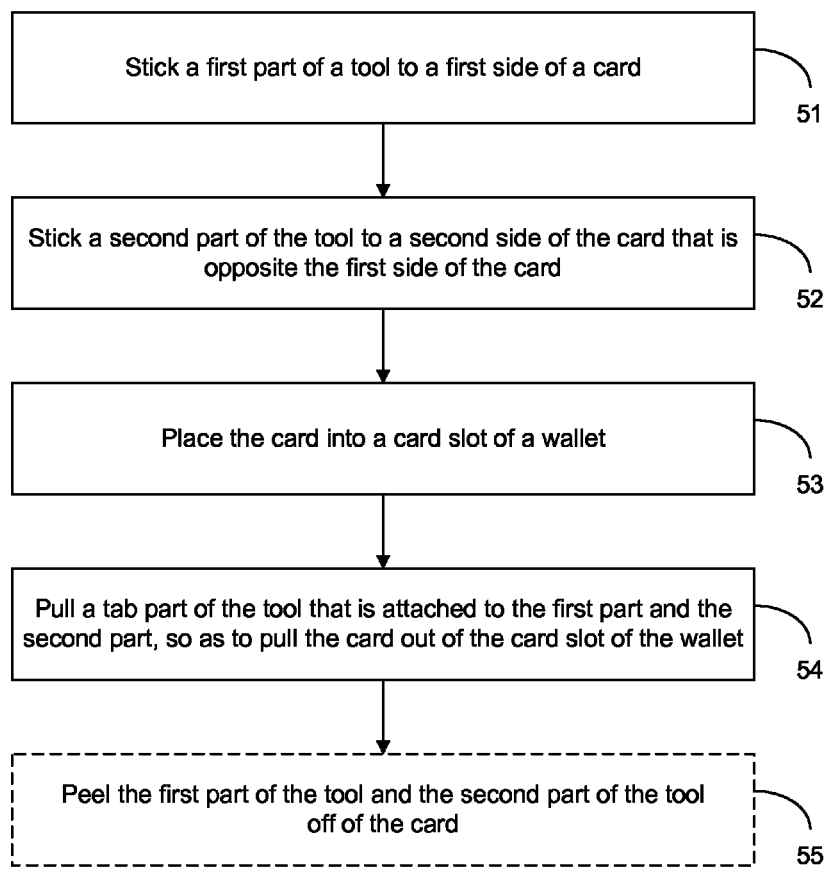
FIG. 5 illustrates a method in accordance with an embodiment of the present invention for using a tool to pull a card out of a card slot of a wallet.

FIG. 5 illustrates a method in accordance with an embodiment for using a tool, such as the tool 10 of FIG. 1A, to pull a card out of a card slot of a wallet. With reference to FIG. 5, in step 51 a first part of the tool is positioned to stick to a first side of the card, and in step 52 a second part of the tool is positioned to stick to a second side of the card that is opposite the first side of the card. In various embodiments, the steps 51 and 52 are performed in sequence while in various other embodiments the steps 51 and 52 are performed at least partially at a same time. For example, the card could be placed between the first part and the second part of the tool and then the first part and the second part could be pressed down at a same time to stick to the card. In step 53, the card is placed into the card slot of the wallet. In step 54, a tab part of the tool that is attached to the first part and the second part is pulled, so as to pull the card out of the card slot of the wallet. In some embodiments, in step 55 the first part of the tool and the second part of the tool are peeled off of the card.

In the method, the card is positioned at least partially between the first part of the tool and the second part of the tool when the first part of the tool and the second part of the tool are stuck to the card. Also, the tab part of the tool extends away from the card to be grasped by a user when the first part of the tool and the second part of the tool are stuck to the card. Various embodiments of the method, therefore, provide a way for a user to use a tool to help pull a card from a card slot of a wallet.

The embodiments disclosed herein are to be considered in all respects as illustrative, and not restrictive of the invention.

The present invention is in no way limited to the embodiments described above. Various modifications and changes may be made to the embodiments without departing from the spirit and scope of the invention. Various modifications and changes that come within the meaning and range of equivalency of the claims are intended to be within the scope of the invention.

What is claimed is:

1. A method of using a tool to pull a card out of a card slot of a wallet, comprising:
   sticking a first part of the tool to a first side of the card;
   sticking a second part of the tool to a second side of the card that is opposite the first side of the card;
   placing the card into the card slot of the wallet; and
   pulling a tab part of the tool that is attached to the first part and the second part, so as to pull the card out of the card slot of the wallet.

2. The method of claim 1,
   wherein the card is positioned at least partially between the first part of the tool and the second part of the tool when the first part of the tool and the second part of the tool are stuck to the card.

3. The method of claim 1,
   wherein the tab part of the tool extends away from the card to be grasped by a user when the first part of the tool and the second part of the tool are stuck to the card.

4. The method of claim 1, further comprising:
   peeling the first part of the tool and the second part of the tool off of the card.

\* \* \* \* \*